(12) United States Patent
O'Donnell, Jr.

(10) Patent No.: US 6,573,887 B1
(45) Date of Patent: Jun. 3, 2003

(54) COMBINED WRITING INSTRUMENT AND DIGITAL DOCUMENTOR

(76) Inventor: Francis E. O'Donnell, Jr., 709 Hamptons La., Town & Country, MO (US) 63017

( * ) Notice: Subject to any disclaimer, the term of this patent is extended or adjusted under 35 U.S.C. 154(b) by 0 days.

(21) Appl. No.: 09/655,224

(22) Filed: Sep. 5, 2000

Related U.S. Application Data

(63) Continuation-in-part of application No. 09/071,086, filed on May 1, 1998, which is a continuation of application No. 08/636,126, filed on Apr. 22, 1996, now abandoned.

(51) Int. Cl.⁷ .................. G09G 5/00; G06K 9/18
(52) U.S. Cl. .......................... 345/179; 382/188
(58) Field of Search ................ 345/156, 179; 178/18.01, 19.01, 19.04, 19.05; 382/106, 107, 181, 187, 188, 189, 312, 313, 314, 317; 702/92, 94, 95; 235/472.01, 472.02, 472.03

(56) References Cited

U.S. PATENT DOCUMENTS

| | | | |
|---|---|---|---|
| 4,780,707 A | 10/1988 | Selker | 178/19.01 |
| 5,012,349 A | 4/1991 | de Fay | 358/473 |
| 5,247,137 A | 9/1993 | Epperson | 178/19.04 |
| 5,291,213 A | 3/1994 | Krauss | 345/179 |
| 5,294,792 A | 3/1994 | Lewis et al. | 250/221 |
| 5,311,208 A | 5/1994 | Burger et al. | 345/157 |
| 5,371,516 A | 12/1994 | Toyoda et al. | 345/179 |
| 5,434,371 A | 7/1995 | Brooks | 178/19.04 |
| 5,434,594 A | 7/1995 | Martinelli et al. | 345/179 |
| 5,446,559 A | 8/1995 | Birk | 358/473 |
| 5,548,092 A | 8/1996 | Shriver | 178/19.01 |
| 5,581,783 A | 12/1996 | Ohashi | 710/5 |
| 5,774,602 A | 6/1998 | Taguchi et al. | 382/314 |
| 5,781,661 A * | 7/1998 | Hiraiwa et al. | 382/188 |
| 5,850,058 A * | 12/1998 | Tano et al. | 382/188 |
| 5,852,434 A * | 12/1998 | Sekendur | 345/179 |
| 5,861,877 A * | 1/1999 | Kagayama et al. | 345/179 |
| 6,084,577 A * | 7/2000 | Sato et al. | 345/179 |
| 6,104,388 A * | 8/2000 | Nagai et al. | 345/179 |
| 6,181,329 B1 * | 1/2001 | Stork et al. | 345/179 |
| 6,188,392 B1 * | 2/2001 | O'Connor et al. | 345/179 |
| 6,310,988 B1 * | 10/2001 | Flores et al. | 382/189 |
| 6,348,914 B1 * | 2/2002 | Tuli | 345/179 |
| 6,456,749 B1 * | 9/2002 | Kasabach et al. | 382/314 |
| 6,486,875 B1 * | 11/2002 | O'Donnell, Jr. | 345/179 |

OTHER PUBLICATIONS

Jannot, Mark: Future Ink; from *Discover* 09/98; pp. 42, 44, 46.

* cited by examiner

*Primary Examiner*—Steven Saras
*Assistant Examiner*—Paul Bell
(74) *Attorney, Agent, or Firm*—Paul M. Denk

(57) ABSTRACT

A hand held device that functions as a writing instrument and a generator of digital copies of the written product. The device is configured like a writing instrument, having an elongated tubular body and a writing point. The device also has an internal position sensing devices, a written image detector, a microprocessor that converts movement of the instrument and the detected image into data and a transmitter to transmit the data to a digital device such as a computer.

20 Claims, 1 Drawing Sheet

COMBINED WRITING INSTRUMENT AND DIGITAL DOCUMENTOR

CROSS-REFERENCE TO RELATED APPLICATIONS

This application is a continuation-in-part of U.S. patent application Ser. No. 09/071,086 filed May 1, 1998 which is a continuation in part of 08/636,126, filed Apr. 22, 1996 now abandoned.

STATEMENT REGARDING FEDERALLY SPONSORED RESEARCH OR DEVELOPMENT

Not applicable.

BACKGROUND OF THE INVENTION

This invention relates generally to computer equipment and, more particularly, to a device that functions as a hand-held writing instrument and as a generator of digital copies of whatever is written.

Word processing by keystroke entry is a relatively slow process. Moreover, with the development of the wireless internet made possible by digital cell phone technology, there exists a need for the creation of digital documents such as e-mail while the sender is mobile. In such a mobile environment, dependence on keystroke entry of data requires the use of miniature keyboards that are very tedious to use. Although voice recognition technology could be used as an alternative upload, it remains relatively slow as well and it suffers from requirement for seclusion in order to avoid extraneous noise and in order to ensure privacy. By contrast, handwriting often is the fastest and most convenient way to prepare documents. In some applications, such as medical records, it is the only practical data entry and data storage means available. This has retarded the ability of healthcare to take full advantage of the internet because it has made the creation of an electronic medical record a redundant task. That is the healthcare provider must write in the chart then either enter data via keystroke or dictate the document and use voice-recognition software or a transcriptionist to convert the information into a digital document. Of course, conventional pen on paper handwriting has significant drawbacks. However, there is computer software available that converts handwriting to typeface and further support writing by hand in the production of documents. Nevertheless, limitations imposed by the hardware required for such pen-based digital document applications have restricted the use and growth of pen-based digital documents to date. Pen-based digital document production heretofore has consisted of grid-type computers with stylus-type writing instruments. Pressure from the stylus on a pressure-sensitive computer screen is used to create a digital copy of the written material. Handwriting software recognition programs can be used to convert the script to printed text. Another approach uses a radio frequency (RF) generator incorporated into a writing pen in conjunction with a special pad containing an array of RF signal receptors in order to track the position of the pen tipin the document. This information is used to create a digital copy of the written document. An example of this technology is the system sold by A. T. Cross under the trademark "I Pen". These types of systems are inconvenient, however, because they necessitate access to the special screen or pad. That is, the writing instrument is limited to its application within the system and cannot be used independently of the special screen or pad to create the digital document. Attempts to create writing instruments that could make digital copies of the written document independent of a special writing pad or screen include the use of a special paper with a subtle pattern on it for recognition by a sensing means, the Anoto system (Ericcson Manufacturing, Sweden). This is impractical because it requires that every document be prepared on this special paper. The pad, grid and special paper technologies represent a means of sensing and tracking position of the writing device in a document. Others have attempted to create a digital record of the written document by using specially modified writing instruments that do not require special screens, pads, or paper. Whereas the latter approaches all use a position-sensing means to create the digital record, these alternate approaches use motion-detection means of the writing instrument alone to create a digital copy of the written document. The advantage of using such motion-sensing means is that it allows the use of the device on any ordinary writing surface. For example, in 1964, Armbruster (U.S. Pat. No. 3,376,551) described a magnetic writing device wherein an ink pen mechanism included a rotating ball for the electromagnetic detection and quantification of movement by induction of an electric current. Thus, distance was not directly measured. The speed of ball rotation determined the amount of electric current induced which was proportional to the velocity. The output was variably to an electric typewriter or to a computer. After the introduction of the computer mouse in the 1980's, Masaki (U.S. Pat. No. 5,159,321) in 1992 taught the use of an ink pen mechanism including a rotating ball that would function as a mouse-like device for computer input. Unlike Armbruster, Masaki taught a spring-type of sensor mechanism for detection and quantification of movement of the rotating ball point wherein ink on the ball surface would cause displacement of two spring-loaded sensing devices at right angles yielding velocity data. In my co-pending application (U.S. patent application Ser. No. 09/071,086), I disclose a distantometer means to detect motion of the writing pen in order to create a digital copy of the written document. Others have taught the use of tiny microaccelerometers to create a digital copy of the written document (WO9922338).

These approaches that use a motion-sensing means give the user more freedom because they don't require a special writing surface like the position-sensing technologies. On the other hand, they have limitations such as the inability to edit a document because the position or location of the writing device in the digital copy is unknown. This also limits their usefulness for writing other than for continuous script or cursive. That is to say, such motion-sensing technologies must assume that the written data always belongs at the trailing end of the document. Thus printing, symbol drawing as for the Chinese language, mathematical formulas, picture drawing, table creation, and the like are all very difficult if not impossible with these motion-sensing technologies. This inability to identify position in a document is a severe disadvantage of writing devices that use a motion-sensing technology to create a digital copy of the written document.

The present invention shares the freedom of use of the motion-sensing technologies but overcomes the limitations of the prior art by using a position-sensing means. Moreover, unlike all prior position-sensing art, the position-sensing means of the present invention does not require a special writing surface.

SUMMARY OF THE INVENTION

It is among the principal objects of the present invention to provide a writing instrument that also can create a contemporaneous digital copy of the written document.

Another object of the present invention is to provide a device that can be used to write cursive, print, draw, create symbols, record mathematical functions, format, tabulate, and edit documents in writing and in digital format without dependence on a special writing surface.

Another object of the present invention is to provide such a writing instrument that can be used to record on normal writing surfaces such as white paper while creating a digital copy of the written document.

Another object of the invention is to provide a means to transmit the digital data from the writing device to a digital device such as a digital audio speaker, digital display screen, personal computer, laptop computer, personal digital assistant, netpliance, digital cell phone, or to a server on the internet.

Yet another object of the invention is to provide such a writing instrument capable of producing a digital copy of the written document but that does not require a special writing surface such as a pad, grid, or specially marked paper.

Another object of the invention is to provide such a writing instrument that can collect, process, and store digital data from the instrument as the device is being used.

Another object of the present invention is to provide for downloading of digital data from external sources, and the audio or visual display of said data.

Another object of the present invention is to provide an audio or visual display within the device of the digital data for confirmation by the operator of the digital data produced by the device.

In accordance with the invention, generally stated, a writing instrument that also functions as a digital document generator and transmitter is provided. The writing instrument is configured like a pen, although the writing point can be a fountain pen, ballpoint pen, laser pen, jet pen, pencil, marker, chalk and the like. Further, the device contains a position-sensing means by which a change in the position of the device in the document is detected without dependence on a special writing surface. The device includes a sensing means to determine when the positional changes are due to written elements and when the positional changes are due to non-writing movements such as for punctuation, editing, printing, and the like. The device also includes a microprocessor means to measure the positional data changes, a memory means for data storage, and a power means for energy. The device includes a transmission means for communication of the data to a computer or to the internet or other such digital devices.

DETAILED DESCRIPTION

Figure 1:
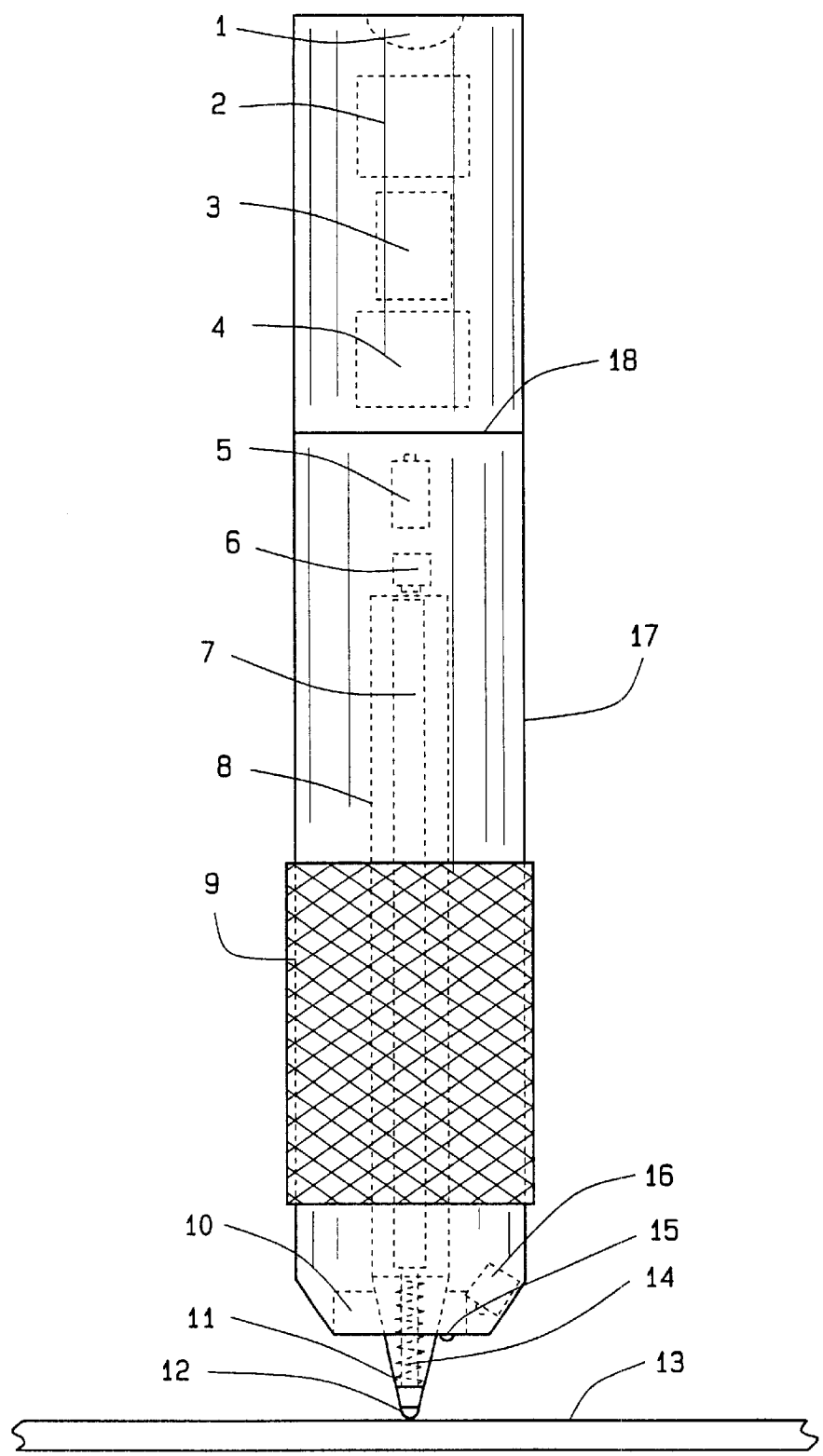
FIG. 1. A lateral view of the writing device as a ballpoint pen with an optical position-sensing means.

The device consists of a writing tip (12), shown here as a ballpoint pen tip, with ink cartridge (7) positioned within the lower portion of the device housing (17). For convenience, the housing may feature a knurled grip sleeve (9) near the writing end of the device. In this embodiment, the writing tip nib (11) engages an internal tension spring (14) for displacement of a sliding tube assembly (8) for contact with the receptor (6) thereby signaling to the microprocessor (4) that the writing element is engaged onto the writing surface (13) for character generation on the writing surface. When the device is lifted off the writing surface for positioning such as word spacing, the contact at (6) is released signaling that the device motion is not due to character formation on the writing surface. The camera (10) is positioned so that it can capture images of the writing surface focused by the lens (15) and illuminated by the light source (16). The image data from the camera is transmitted to a flash memory card (3) for subsequent relay on to and analysis by the microprocessor or directly through to the microprocessor. Output from the microprocessor is then stored in the flash memory card for relay onto a radio frequency (RF) digital transmitter/receiver (2). The battery (5) is positioned along the central cavity of the device. A screw type closing/opening mechanism of the device housing(18) can be conveniently located at about the level of the battery and ink cartridge in order to allow access for change of either component. In this embodiment of the invention, the camera also serves as a photodetector means wherein the camera is monitoring the intensity of the illuminated field. A sub-threshold light intensity signal from the camera results in a signal from the microprocessor means to an audio alarm from a digital speaker(l).

Preferred Embodiments

It is a preferred embodiment of the present invention that a ballpoint pen have near the nib a small charge coupled device (CCD), or a complementary metal-oxide semiconductor image sensor (CMOS) (Photobit, Inc., Pasadena, Calif.) for capture of images of the writing surface. The CCD, CMOS, or other type of camera can be oriented so as to "look" parallel to, or directly at, the area of the writing surface upon which the written material is being created. That is to say, the optical position-sensing technology does not rely upon a view of the written characters in order to function properly. The camera can be selected so as to be sensitive to wavelengths invisible to the human eye such as ultraviolet and infrared light. In order to enhance the normal surface features and minor imperfections of the writing surface, the light source preferably should have an effective angle of about 75 degrees or less to the writing surface using a light source such as a visible, ultraviolet or infrared coherent (i.e. laser) or non-coherent light. Reflective devices such as mirrors and other directional optical devices such as fresnel prismatic lenses, and fiberoptic bundles and the like can be used so that the camera itself and the light source are more remote from the writing tip. Moreover, the housing of the writing tip can be transparent to infrared light or ultraviolet light but opaque to visible light and therefore hide the optical imaging system from view. As the pen is used to write, the writing tip is depressed slightly so as to signal to the built-in microprocessor that the positional change is due to creating a character or stroke and not to non-writing positional changes required for crossing the T or doting the I or J, punctuation, word spacing, alphabetical letter printing, symbols, editing, table formation, drawing, mathematical formulas, and the like. For the purposes herein, we define character generation as the strokes of writing that make contact between the writing tip and the writing surface. Alternatively, the device can contain a button, which must be depressed during character generation in order, for example, to expose the writing tip. Alternatively, a strain gauge can be used to detect pressure on the writing tip during contact with the writing surface, or a microaccelerometer can be used to identify the very sudden changes in acceleration due to resistance of the pen against the writing surface that is evident in writing as opposed to nonwriting positional changes. When the writing device is repositioned to execute non-writing positional functions as opposed to character generation, it is important that the position in the document be tracked by the microprocessor. Therefore, if the user begins to lift the writing instrument too far away from the writing surface, the user is warned by a signal such as an audio beep. The distance above the writing surface can be ascertained, for example, by using a photodetector wherein a drop off in the intensity of the illuminated field below a preset threshold would result in the microprocessor generating a signal to a warning mechanism so as to alert the user that any further distance will result in a loss of positional data required for full function of the device. Preferably, this intensity should correlate to a distance of at least 5 mm or so from the writing surface. If the position within the document is lost, the writer can place the writing device at the last written element and signal to the system, for example, by double depressing the writing tip, in order to identify a reference position within the document and thus regain full function of the device. With restoration of full function, the device can be used once again to make non-writing positional changes for editing, printing, symbol generation, drawing, tabulation, mathematical formulation, and the like. The imaging sample rate of the camera is preferably set at a sufficient frequency such as required to accommodate even a very fast writer. Typically, an image sample rate of 100 hz to 10,000 hz is used. A typical flash memory device can buffer the serial image files if needed in order to be available for analysis by the microprocessor means. The microprocessor determines the serial positional change by comparing the landmarks on the writing surface to the landmarks on the preceding image of the writing surface in order to determine change in direction and distance. The preferred processing power is in the range of 5–25 or more MIPS. The distance and directional data are typical two dimensional vector information that is then stored in a memory device for later transmission. This can be a typical flash memory card.

Subsequent transmission can be via detachable memory chip, wire, or wireless. In the latter case, the mode of transmission can be via infrared, radio frequency, ultrasound, or digital cellular telephony. If the user has access to a digital cell phone, wireless radio frequency transmission from the pen to the digital cellular phone is a preferred embodiment. Regardless of the mode of data transmission from the writing device, the data can be transmitted to any digital device such as a computer, a personal digital assistant (PDA), a netpliance or via the internet to a server. The vector data so generated is conveniently exported to a variety of application programs such as word processing programs, drawing programs, spread sheets, e-mail programs, and the like where it is displayed as written data such as handwriting or printing, or numbers, or formulas, or language symbols such as Chinese. The data can be in ASCII format allowing for easy compression of the files. The conversion of handwritten script information to printed text can be accomplished using a variety of commercially available software programs such as PenOffice (ParaGraph, Inc.). This conversion can occur within the device or in an external digital device such as a personal computer (PC) or a server on the Internet. These handwriting script recognition programs can be self-educating and feature neural networks wherein they improve their accuracy for a specific user by accumulating experience with a variety of words and symbols based upon an individual's edits. If the user is mobile, in particular, and uses a wireless access to the Internet, a preferred embodiment provides a server that stores the individual's handwriting script recognition files for access on the Internet regardless of the users location and independent of the user's access to a computer device. To provide the energy for lighting, image capture, microprocessor, data storage, and data transmission a battery is preferred.

In another preferred embodiment, the same infrared light source used for illumination can also be used conveniently to provide the wireless transmission of data to a digital device such as a personal computer, laptop, personal digital assistant, netpliance, or cellular digital phone using a commercially available IRT(infrared transmission) port. The camera of the invention can be used to receive communication from the digital device such as personal computer, allowing two-way communication between the invention and the digital device.

In another preferred embodiment, the same camera means used for imaging of the writing surface can also be used conveniently to provide a photodetector means for detecting a subthreshold illumination of the writing surface so as to warn the user that the position within the document could become lost with any further movement of the device away from the writing surface.

In another preferred embodiment, the function of the device includes the elimination by the microprocessor means from the digital copy of any section of the written document that is marked for deletion by the operator. For example, a line through a word would result in deletion of that word from the digital copy. Thus the present invention does not require that the final digital copy of the written document be unedited unless so desired.

In another preferred embodiment, the data transmission means of the present invention can allow for two-way communication between the invention and a digital device such as personal computer, laptop, personal digital assistant, netpliance, digital cellular phone, and the like. In this embodiment, the present invention can provide many of the functions of the. digital device. For example, using the audio speaker of the present invention, data downloaded from a digital device can be available to the operator of the present invention. Conversion of digital data to speech is widely available. Moreover, the audio output can be used to monitor the digital data output of the present invention. For example, if the invention is being used to write a prescription, the audio output could confirm the identification of the prescription and the instructions for dispensing and taking the prescription.

In another embodiment of the present invention, the inclusion of a display screen such as an LED (light emitting diode) on the side of the writing device of the present invention provides a convenient means of displaying downloaded digital data as well as data generated by the use of the invention. For example, the download might be a series of questions as for an examination. In another example, the operator may write a prescription and the display shows the data conversion to printed text for confirmation of the prescription.

Variations or modifications to the subject matter of this invention may occur to those skilled in the art upon review of the summary provided herein, in addition to the descriptions of its preferred embodiment, in light of the drawings. Such variations, if within the spirit of this invention, are intended to be encompassed within the scope of the invention as described herein.

What is claimed:

1. A handheld communication device that is used to create a written document and to create a digital copy of said document comprising:

a writing means;

a position-sensing means that functions without the need for a special writing surface to create the digital copy;

a camera means to capture serial images of the writing surface;

an illumination means to highlight imperfections on the writing surface;

a photodetector to determine a reduction in illumination from the illumination means, and said photodetector also sensing an impending loss of positional data from a reduction in illumination due to lifting of the writing device too far above the writing surface, and wherein said photodetector includes a signal means that is used to alert the user to an impending loss of positional data;

a microprocessor means to compare the serial images of the writing surface for measuring positional changes of the device;

a data storage means for input into and/or output from the microprocessor means;

an energy source means to power the illumination, camera, memory, and microprocessor means, photodetector means; and said signal means used to alert the user to an impending loss of positional data from a reduction in illumination due to lifting the writing device too far above the writing surface.

2. The writing means of claim 1 selected from the group of fountain pen, ballpoint pen, pencil, marker; chalk, stylus, and laser pen.

3. The illumination means of claim 1 wherein illumination is produced in an energy wavelength that is invisible to the human eye but detectible by the camera imaging means.

4. The illumination means of claim 1 wherein illumination is produced in an energy wavelength selected from the group comprising infrared or ultraviolet wavelengths.

5. The camera imaging means of claim 1 wherein a charge coupled device (CCD) is used.

6. The camera imaging means of claim 1 wherein the camera selected is sensitive to light that is invisible to the human eye.

7. The microprocessor means of claim 1 wherein the serial surface images captured by the camera imaging means are compared one to another by the microprocessor in order to measure the positional changes of the device.

8. The camera imaging means of claim 1 wherein the camera is also used as the photodetector means.

9. A handheld communication device that is used to create a written document and to create a digital copy of said written document comprising:

a writing means;

a position-sensing means that does not require a special writing surface for creation of the digital copy;

a detection means for identifying and signaling writing device positional changes that are due to character generation on the writing surface;

a camera means to capture serial images of the surface imperfections of the of the surface being detected;

an illumination means;

a photodetector for detecting changes in illumination;

a microprocessor for processing and digitizing output from the position sensing means, the detection means and the camera; and said photodetector to determine a reduction in illumination from the illumination means, and said photodetector also sensing an impending loss of positional data from a reduction in illumination due to lifting of the writing device too far above the writing service.

10. The detection means of claim 9 wherein the writing device tip is depressed in order to perform character generation on the writing surface.

11. The detection means of claim 9 selected from the group comprising a button on the device that must be depressed to perform writing on the surface, a strain gauge which detects pressure of the writing tip on the writing surface, or a microaccelerometer which detects resistance to the motion of the tip on the writing surface.

12. The detection means of claim 9 wherein the device can be used to mark the written document in a manner so as to signal to the microprocessor means to make an edit to the digital document.

13. A handheld communication device that is used to create a written document and to create a digital copy of said written document comprising, a writing means;

a position-sensing means that does not require a special writing surface for creation of the digital copy;

a detection means for identifying writing device positional changes that are due to character generation on the writing surface;

illumination means for illuminating the writing surface;

a camera for capturing images on the writing surface;

a microprocessor for processing and digitalizing output form the position-sensing means and the detection means;

a digital data transmission means capable of sending and receiving digital data; and a photodetector to determine a reduction in illumination from the illumination means, and said photodetector also sensing an impending loss of positional data from a reduction in illumination due to lifting of the writing device too far above the writing service.

14. The digital data transmission means of claim 13 selected from the group comprising wire, wireless, or detachable memory chip.

15. The digital data transmission means of claim 13 selected from the wireless group comprising infrared, radio frequency, laser, ultrasound, or digital cellular telephony.

16. The digital data transmission means of claim 15 wherein the data is transmitted using the infrared illumination means wherein illumination is produced in an energy wavelength selected from the group comprising infrared or ultraviolet wavelengths.

17. The digital data transmission means of claim 13 wherein the data is transmitted to a digital device selected from the group comprising digital audio, digital display screen, personal computer, laptop, personal digital assistant, appliances for accessing the internet, digital telephone, and server on the internet.

18. A handheld communications device that is used to create a written document and to create a digital copy of said document comprising:

a writing means; and a position-sensing means that functions without the need for a special writing surface to create digital copy, said position-sensing means consisting of an optical system comprising:

a complementary metal-oxide semiconductor (CMOS) camera imaging means to capture serial images of the writing surface, an illumination means to highlight imperfections on the writing surface, a microprocessor means to compare the serial images of the writing surface for measuring positional changes of the device, a data storage means for input into and/or output from the microprocessor means, an energy source to power the illumination, camera, data storage, and microprocessor means; and a photodetector to determine a reduction in illumination from the illumination means, and said photodetector also sensing an impending loss of positional data from a reduction in illumination due to lifting of the writing device too far above the writing surface.

19. A handheld communications device that is used to create a written document and to create digital copy of said written document comprising;

a writing means;

a position-sensing means that does not require a special writing surface for creation of the digital copy;

a detection means for identifying writing positional changes that are due to character generation on the writing surface;

an illumination means to highlight imperfections on the writing surface;

a photodetector to determine a reduction in illumination from the illumination means, and said photodector also sensing an impending loss of positional data from a reduction in illumination due to lifting of the writing device too far above the writing surface; and a digital data transmission means, said digital transmission means also having the ability to receive digital data from an external digital device.

20. A handheld communications device that is used to create a written document and to create a digital copy of said written document comprising;

a writing means;

a position-sensing means that does not require a special writing surface for creation of the digital copy;

a detection means for identifying writing device positional changes that are due to character generation on the writing surface; and an illumination means to highlight imperfections on the writing surface;

a photodetector to determine a reduction in illumination from the illumination means, and said photodector also sensing an impending loss of positional data from a reduction in illumination due to lifting of the writing device too far above the writing surface; and a digital data transmission means selected from the wireless group comprising infrared, radio frequency, laser, ultrasound, or digital cellular telephony, wherein digital data output is sent to digital components that are part of the device.

* * * * *